United States Patent
Fleischman et al.

(10) Patent No.: US 10,318,639 B2
(45) Date of Patent: Jun. 11, 2019

(54) INTELLIGENT ACTION RECOMMENDATION

(71) Applicant: International Business Machines Corporation, Armonk, NY (US)

(72) Inventors: Thomas J. Fleischman, Poughkeepsie, NY (US); Paul N. Krystek, Highland, NY (US); Shikhar Kwatra, New York City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/423,776

(22) Filed: Feb. 3, 2017

(65) Prior Publication Data

US 2018/0226069 A1   Aug. 9, 2018

(51) Int. Cl.
| | | |
|---|---|---|
| G10L 15/00 | (2013.01) | |
| G06F 17/27 | (2006.01) | |
| G06Q 10/10 | (2012.01) | |
| G10L 15/18 | (2013.01) | |
| G10L 15/26 | (2006.01) | |
| G06Q 30/02 | (2012.01) | |

(52) U.S. Cl.
CPC ......... *G06F 17/279* (2013.01); *G06Q 10/101* (2013.01); *G06Q 30/0282* (2013.01); *G10L 15/26* (2013.01)

(58) Field of Classification Search
CPC ...... G10L 15/1815; G10L 15/22; G10L 15/02
USPC ............................................. 704/9, 257, 275
See application file for complete search history.

(56) References Cited

U.S. PATENT DOCUMENTS

| | | |
|---|---|---|
| 4,449,189 A | 5/1984 | Feix et al. |
| 5,357,427 A | 10/1994 | Langen et al. |
| 5,621,790 A | 4/1997 | Grossman et al. |

(Continued)

FOREIGN PATENT DOCUMENTS

| | | |
|---|---|---|
| CN | 101604204 A | 12/2009 |
| EP | 0082304 A | 6/1983 |

(Continued)

OTHER PUBLICATIONS

N.A. Joshi, "Real-time Document Recommendations Based on User Conversation", International Journal of Innovative Research in Computer and Communications Engineering, Feb. 2016, vol. 4, Issue 2, pp. 2531-2537.

(Continued)

*Primary Examiner* — Thierry L Pham
(74) *Attorney, Agent, or Firm* — Patent Portfolio Builders PLLC (57) ABSTRACT

Intelligent action recommendation in a conversation monitors content of a conversation among at least two participants in real time. An overall goal of the conversation that represents a motivation for at least one of the participants to engage in the conversation is identified. The overall goal of the conversation is to be achieved upon termination of the conversation. At least one conversational input relevant to the monitored content and having a likelihood of advancing the conversation to successful achievement of the overall goal of the conversation is identified. The identified conversational input is communicated to at least one of the participants in the conversation.

20 Claims, 4 Drawing Sheets

(56) References Cited

U.S. PATENT DOCUMENTS

| | | |
|---|---|---|
| 5,694,523 A | 12/1997 | Wical |
| 5,708,822 A | 1/1998 | Wical |
| 5,864,815 A | 1/1999 | Rozak et al. |
| 6,246,990 B1 | 6/2001 | Happ |
| 6,356,869 B1 | 3/2002 | Chapados et al. |
| 6,496,799 B1 | 12/2002 | Pickering |
| 6,941,266 B1 | 9/2005 | Gorin et al. |
| 7,058,208 B2 | 6/2006 | Chang et al. |
| 7,058,565 B2 | 6/2006 | Gusler et al. |
| 7,069,220 B2 | 6/2006 | Coffman et al. |
| 7,167,824 B2 | 1/2007 | Kallulli |
| 7,228,278 B2 | 6/2007 | Nguyen et al. |
| 7,257,537 B2 | 8/2007 | Ross et al. |
| 7,319,992 B2 | 1/2008 | Gaos |
| 7,577,244 B2 | 8/2009 | Taschereau |
| 7,603,273 B2 | 10/2009 | Poirier |
| 7,751,597 B2 | 7/2010 | Gabara |
| 7,809,569 B2 | 10/2010 | Attwater et al. |
| 7,930,183 B2 | 4/2011 | Odell et al. |
| 8,006,261 B1 | 8/2011 | Haberman et al. |
| 8,073,681 B2 | 12/2011 | Baldwin et al. |
| 8,140,335 B2 | 3/2012 | Kennewick et al. |
| 8,326,627 B2 | 12/2012 | Kennewick et al. |
| 8,903,940 B2 | 12/2014 | Martin et al. |
| 9,070,357 B1 | 6/2015 | Kennedy et al. |
| 9,105,047 B1 | 8/2015 | Curran et al. |
| 9,349,100 B2 | 5/2016 | Kozloski et al. |
| 2002/0040297 A1 | 4/2002 | Tsiao et al. |
| 2002/0133404 A1 | 9/2002 | Pedersen |
| 2002/0178005 A1 | 11/2002 | Dusan et al. |
| 2003/0078972 A1 | 4/2003 | Tapissier et al. |
| 2003/0091163 A1 | 5/2003 | Attwater et al. |
| 2003/0125954 A1 | 7/2003 | Bradley et al. |
| 2003/0149561 A1 | 8/2003 | Zhou |
| 2004/0056907 A1 | 3/2004 | Sharma et al. |
| 2004/0095389 A1 | 5/2004 | Sidner et al. |
| 2004/0172252 A1 | 9/2004 | Aoki et al. |
| 2004/0183829 A1 | 9/2004 | Kontny et al. |
| 2005/0075878 A1 | 4/2005 | Balchandran et al. |
| 2005/0135571 A1 | 6/2005 | Bangalore et al. |
| 2005/0182625 A1 | 8/2005 | Azara et al. |
| 2005/0246165 A1 | 11/2005 | Pettinelli et al. |
| 2006/0074670 A1 | 4/2006 | Weng et al. |
| 2006/0122834 A1 | 6/2006 | Bennett |
| 2006/0149544 A1 | 7/2006 | Hakkani-Tur et al. |
| 2006/0206332 A1 | 9/2006 | Paek et al. |
| 2006/0271408 A1 | 11/2006 | Rosenfeld et al. |
| 2007/0106127 A1 | 5/2007 | Alman |
| 2007/0285505 A1 | 12/2007 | Korneliussen |
| 2008/0004881 A1 | 1/2008 | Attwater et al. |
| 2008/0052080 A1 | 2/2008 | Narayanan |
| 2008/0114837 A1 | 5/2008 | Biggs et al. |
| 2008/0139112 A1 | 6/2008 | Sampath et al. |
| 2008/0281687 A1 | 11/2008 | Hurwitz et al. |
| 2009/0055267 A1 | 2/2009 | Roker |
| 2009/0076798 A1 | 3/2009 | Oh et al. |
| 2009/0287678 A1 | 11/2009 | Brown et al. |
| 2010/0042470 A1 | 2/2010 | Chang et al. |
| 2010/0091971 A1 | 4/2010 | Famous |
| 2011/0035280 A1 | 2/2011 | Fordyce, III et al. |
| 2011/0173071 A1 | 7/2011 | Meyer et al. |
| 2011/0246910 A1 | 10/2011 | Moxley et al. |
| 2011/0283190 A1* | 11/2011 | Poltorak ............ G06F 17/30029 715/716 |
| 2012/0081506 A1 | 4/2012 | Marvit |
| 2012/0109753 A1 | 5/2012 | Kennewick et al. |
| 2012/0278073 A1 | 11/2012 | Weider et al. |
| 2013/0036009 A1 | 2/2013 | Heiser, II et al. |
| 2013/0054433 A1 | 2/2013 | Giard et al. |
| 2013/0060587 A1 | 3/2013 | Bayrak et al. |
| 2013/0124189 A1* | 5/2013 | Baldwin ............. G10L 15/1815 704/9 |
| 2013/0297471 A1 | 11/2013 | Gaskell, II |
| 2013/0311270 A1 | 11/2013 | Daftary et al. |
| 2014/0038578 A1 | 2/2014 | Bouzid et al. |
| 2014/0244359 A1 | 8/2014 | Haber et al. |
| 2014/0277735 A1 | 9/2014 | Breazeal |
| 2016/0140320 A1 | 5/2016 | Moturu et al. |
| 2016/0180735 A1 | 6/2016 | Clark et al. |
| 2016/0226813 A1 | 8/2016 | Cecchi et al. |
| 2016/0232201 A1 | 8/2016 | Goran et al. |
| 2017/0026514 A1 | 1/2017 | Dwyer et al. |

FOREIGN PATENT DOCUMENTS

| | | |
|---|---|---|
| EP | 0781024 A2 | 6/1997 |
| EP | 2234380 A1 | 9/2010 |
| JP | 2004259238 A | 9/2004 |
| JP | 2006061632 A | 3/2006 |
| JP | 5495968 B2 | 5/2014 |
| WO | 2011088053 A2 | 7/2011 |
| WO | 2012064999 A1 | 5/2012 |
| WO | 2015023546 A1 | 2/2015 |
| WO | 2016077697 A1 | 5/2016 |

OTHER PUBLICATIONS

S. Sahay et al., "Cobot: Real Time Multi User Conversational Search and Recommendations", Recommender Systems and the Social Web, 2009, vol. 532, CEUR Workshop Proceedings.

List of IBM Patents or Patent Applications Treated as Related.

* cited by examiner

INTELLIGENT ACTION RECOMMENDATION

FIELD OF THE INVENTION

The present invention relates to system-generated recommendations in conversations and natural language processing.

BACKGROUND OF THE INVENTION

Participants engage in conversations to achieve personal or business goals. In general, the conversation involves an alternating exchange of verbal or written information among the parties. The selection, communication and interpretation of the verbal or written information exchange among the participant is important in achieving the desired personal or business goals. This includes the content of the selected verbal or written information, the order in which the verbal or written information is exchanged and the manner in which the verbal or written information is exchanged, e.g., the expression of the communicating participant.

The need to select the appropriate content at the appropriate time and to communicate that content in an appropriate manner to achieve the desired overall goal of the conversation can result in awkwardness or misinterpretation in any conversation among multiple participants. For example, a given participant may not be able to communicate content in a manner that is received positively by the other participant. The receiving participant may be insulted or upset, and the communicating participant may be unintentionally considered rude. In addition, the communicating party may not appreciate the source of the receiving party's discontent and may not know a solution. Failure to correct this misunderstanding could jeopardize the overall goal of the conversation such as reaching agreement on a business transaction and executing the appropriate documents.

While solutions exist for making recommendations for documents or other information related to a conversation, a need still exists for systems that provide an intelligent way to make better decisions regarding the actual content of conversations based on the overall goal of the conversation.

SUMMARY OF THE INVENTION

Exemplary embodiments are directed to monitoring conversations between two of more participants in real-time and making recommendations to one or more of the participants regarding conversation content having a desired likelihood or confidence of advancing the real-time conversation to a successful resolution of the overall goal of the conversation or the overall goal of the interaction among the participants in the real-time conversation. In order to facilitate analysis of the goals and current state of the conversation among the participants and to make recommendation, a database or history of interactions or conversations among the participants is maintained. This history includes an identification of previous overall goals of conversations and interactions among the participants and a record of the content of previous conversations among the participants including the content or actions taken in those conversations, the order in which content or actions were taken in those conversations and an effect on at least one of the conversation, the overall goal of the conversation and the overall goal of the interaction among the participants associated with the content or actions.

A current real-time conversation among the participants is identified and monitored. Monitoring the current real-time conversation includes using natural language processing, for example, Watson Analytics, which is commercially available from International Business Machines Corporation of Armonk, N.Y., to analyze the current content or exchanges in a conversation between the at least two participants. For example, Watson Analytics are used to determine pieces of conversation via keyword extraction and sense of tone. Monitoring is conducted in order to make recommendations for subsequent content, actions or exchanges in the conversation that will advance the conversation toward a desired final resolution, i.e., an overall goal of the conversation or interaction among the participants in the conversation is determined. The overall goal of the conversation can be the same as the overall goal of the interaction among the participants. Alternatively, the overall goal of the conversation is an intermediate step in the overall goal of the interaction among the participants. Therefore, the overall goal of the conversation and the overall goal of the interaction among the participants can both be determined. Overall goals can be determined by receiving input from one or more of the participants identifying goals, based on the identity of the participants in the conversation, using a history of interactions and conversations among the participants, using content of the current real time conversation and combinations thereof. The overall goal of the conversation can be a joint goal shared by all of the participants or an individual goal of one of the participants. The goals can be business or work goals, e.g., executing a contract between two parties and conducting a negotiation among parties, or social goals, e.g., scheduling a social activity such as a date or obtaining a personal letter of recommendation.

Having identified the overall goal of the conversation, a plurality of objectives for the conversation is identified. The objectives are steps or benchmarks to be met in achieving the overall goal of the conversation. Therefore, the conversation is monitored and based on the current state of the current real-time conversation or dialog, the tone of the conversation and previous conversations or correspondence, a next objective for the conversation is identified. In one embodiment, the next objective in the current real time conversation is determined from the history or pattern of conversations one participant, e.g., the user of the system, previously engaged in with another participant, i.e., a particular person of interest.

Then at least one or a plurality of conversational inputs is identified. Each conversational input includes conversational content, e.g., words or statements and an associated or predicted confidence level that the conversational input will achieve the next objective and advance the conversation toward the desired overall conversational goal. In one embodiment, visual body language analysis of one or many participants in the conversation is also used. This visual body language analysis can be used to propose next objectives and conversational inputs and to determine confidence levels. In one embodiment, the conversational input, or the next objective, is selected based on the identified or predicted confidence level that the advised conversational input or next objective was actually used by the participant and was successful in achieving the next objective or overall goal of the conversation. The identified or predicted confidence level can be determined from the previously identified and communicated next objectives and conversational inputs.

The conversational input with the desired confidence level is selected and is communicated to one or more of the participants, for example, using a graphical display. Monitoring of the conversation continues, and subsequent objectives and conversational inputs are identified and communicated to the participants. In one embodiment, conversational monitoring, next objective determination and conversational input and communication are continued until the overall goal of the conversation is achieve. In one embodiment, subsequent or additional conversations are recommended in order to achieve the overall goal of the interaction among the participants.

Exemplary embodiments are directed to a method for intelligent action recommendation in a conversation. Content of a conversation among at least two participants is monitored in real time. In one embodiment, monitoring content of the conversation includes capturing at least one of oral communications among the participants, written communications among the participants, video of an environment containing at least one of the participants and physiological data for one or more participants. In one embodiment, monitoring content of the conversation includes capturing oral communications among the participants and using natural language processing to analyze the oral communications.

An overall goal of the conversation that represents a motivation for at least one of the participants to engage in the conversation is identified. The overall goal of the conversation is to be achieved upon termination of the conversation. At least one conversational input relevant to the monitored content and having an associated likelihood of advancing the conversation to successful achievement of the overall goal of the conversation is identified. In one embodiment, the conversational input is text to be exchanged in writing, text to be spoken, a recommended conversational tone, physical gestures or combinations thereof. In one embodiment, a plurality of conversational inputs is identified. Each conversational input has an associated likelihood of advancing the conversation to successful achievement of the overall goal of the conversation. The conversational inputs having the highest likelihood of advancing the conversation to successful achievement of the overall goal of the conversation are selected.

In one embodiment, identifying the at least one conversational input includes using a history of conversations among the plurality of participants to identify the at least one conversational input. The history of conversations among the plurality of participants is maintained, and the history of conversations among the plurality of participants includes at least one of monitored content, overall goals of the conversations, exchanged conversational inputs with associated likelihoods of advancing the conversation to successful achievement of the overall goal of the conversation and results of the exchanged conversational inputs. The conversational input is communicated to at least one of the participants in the conversation.

In one embodiment, a next objective to be accomplish in the conversation to advance the conversation toward the overall goal of the conversation is identified, and the at least one conversational input is identified to achieve the next objective. In one embodiment, the monitored content of the conversation is used to determine an effect of the communicated conversational input on achieving the overall goal of the conversation.

Exemplary embodiments are also directed to a computing system for intelligent action recommendation in a conversation. The computing system includes monitoring modules to monitor content of a conversation among at least two participants in real time, and a conversation goal determination module to identify an overall goal of the conversation that represents a motivation for at least one of the participants to engage in the conversation. The overall goal of the conversation is to be achieved upon termination of the conversation. An objective and conversational input determination module identifies at least one conversational input relevant to the monitored content and determines a likelihood of advancing the conversation to successful achievement of the overall goal of the conversation for the at least one conversational input. Communication modules are provided to communicate the conversational input to at least one of the participants in the conversation. In one embodiment, the objective and conversational determination module is further configured to identify a next objective to be accomplish in the conversation to advance the conversation toward the overall goal of the conversation, and the objective and conversational determination module identifies the at least one conversational input to achieve the next objective.

DETAILED DESCRIPTION

Exemplary embodiments are directed to systems and methods for recommending intelligent actions in a conversation between two or more participants in order to achieve at least one of an overall goal of the conversation or an overall goal of the interaction among the participants. Suitable conversations include, but are not limited to, an in-person conversation, an audio conversation, for example, across a telephone network, a video conversation and a text message or E-mail conversation. The conversation is monitored and analyzed in real time based on, for example, a determined sense of tone and conversation content using, for example, keyword extraction. This monitoring and analysis can be used to determine an overall goal of the conversation. This overall goal can also be identified from a history of interaction among the participants in the conversation and inputs from one or more participants expressly identifying an overall goal of the conversation.

Monitoring the conversation includes monitoring the content of the conversation including spoken communications and text communications, monitoring the physiological conditions of one or more of the participants and monitoring body language from one or more participants. In one embodiment, the monitored body language of one or more participants is analyzed in real time to determine the mood of the participants and the tone of the conversation.

In order to achieve the determined overall goal of the conversation, at least one or a series of actions or objectives are identified. These objectives are determined based on at least one of the current content of the conversation and a history of interactions and conversations among the participants. The order in which the series of objectives is achieved can vary; therefore, a next objective is identified. Having identified the next objective to be achieved during the conversation, conversational inputs are identified that can be used to achieve the next objective. Each conversational input, and if desired, each objective, has an associated confidence level that the conversational input will achieve the next objective or that the next objective will advance the conversation to the successful completion of the overall goal. The confidence level can also express a confidence that the conversational input will be positively received by the receiving participant. In one embodiment, at least one of the body language of the participants, the physiological condition of the participants, the tone of the conversation and the mood of the participants are used in selecting the next objective and the conversational input. In one embodiment, monitoring is used to detect inappropriate language, slang terms or wording and phrases that are offensive to certain cultures, and a conversational input containing recommended appropriate language is identified.

The selected conversational input is provided to a participant, and that participant communicates the conversational input to one or more of the other participants. Continued monitoring of the conversation is used to obtain feedback dynamically. This feedback includes a determination of how the conversational input was received and whether or not the next objective was achieved. The obtained feedback in combination with the history of interactions and conversations among the participants are used to suggest subsequent next objectives and conversational inputs. In one embodiment, the response or reaction of the participant receiving the communicated conversational input is monitored. The monitored response or reaction is used to avoid objectives and conversational inputs that are offensive to one or more participants. The response or reaction of the receiving participant may indicate confusion or a lack of familiarity or knowledge of the conversational input. Therefore, the monitored response or reaction is used to avoid unknown or confusing conversational inputs and to suggest conversational inputs that are understood and recognize by the receiving participant.

Selection and communication of next objectives and conversation inputs and real-time monitoring of the conversation continues until the overall goal of the conversation is achieved or the conversation advances as far to the overall goal as possible. Feedback is also used to update the determined confidence levels associated with the next objectives and the conversational inputs and to update the history of interactions among the participants.

Figure 1:
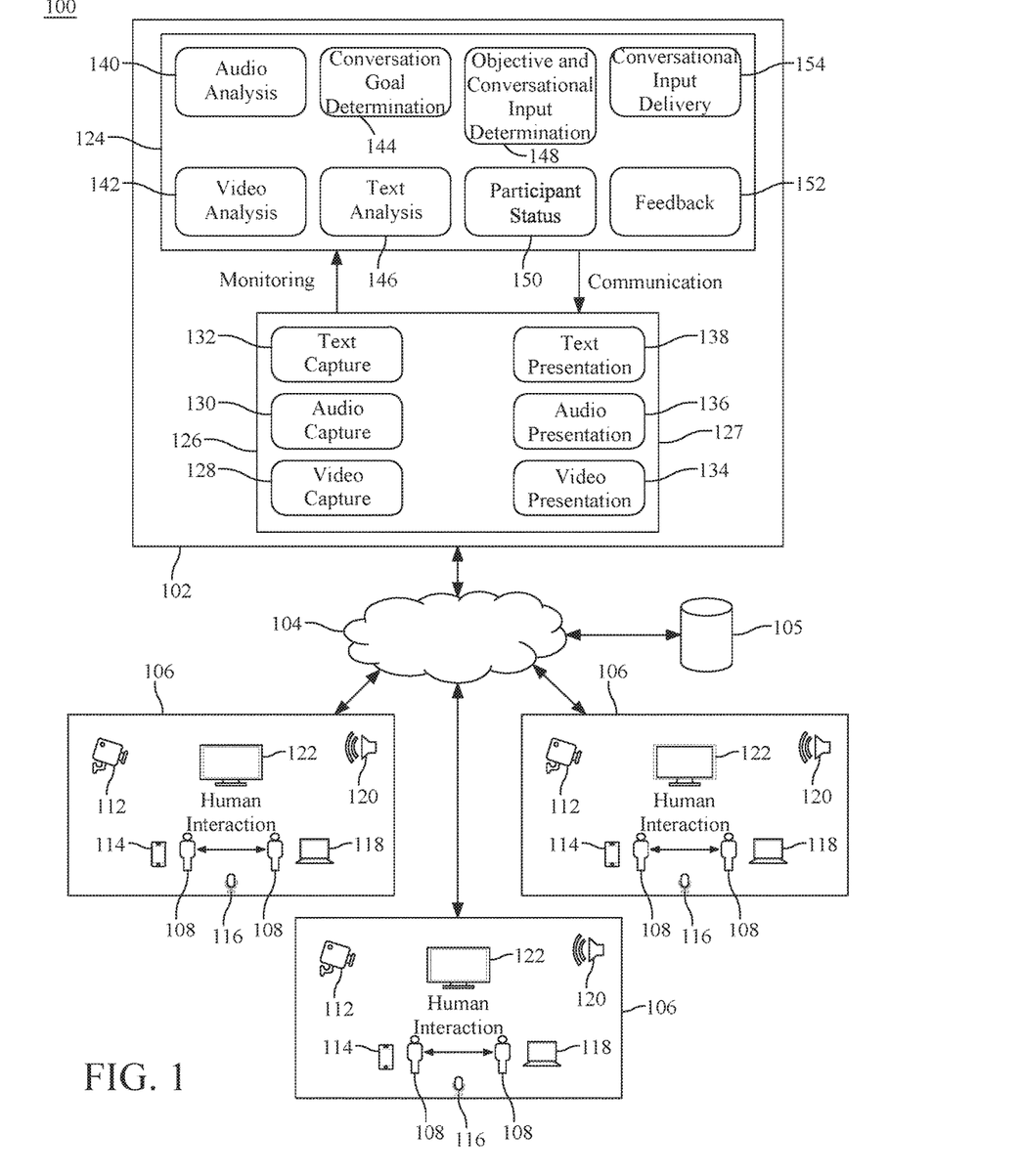
FIG. 1 is an embodiment of a graphical representation of an intelligent action recommendation system.

Referring initially to FIG. 1, exemplary embodiments are directed to an intelligent action recommendation system 100 for monitoring and analyzing conversations in real time among two or more participants to provide system-determined and system-initiated conversational inputs to one or more of the participants in the conversations. The dialog intervention system includes a monitoring and analysis system 102 that is in communication with a conversation being conducted among two or more participants 108. The participants can be located in a single conversation environment 106 or in a plurality of separate and distinct conversation environments. Therefore, a given conversation can include two or more participants located at one or more physical environments. Conversations include the exchange of verbal or oral communications among the participants and the exchange of written communications among the participants. In live conversations, information can also be exchanged through gestures or other non-verbal communications.

User devices located in each conversational environment can be used to exchange the oral and written content among the participants. The user devices can also be used to monitor the conversations and capture the data or conversational content. Therefore, each physical conversation environment includes a plurality of user content exchange and conversation content capture devices. Suitable devices include, but are not limited to, video cameras 112, microphones 116, computers 118 and smart phones 114 or text message enabled devices. Some of the devices that provide for exchanging oral and written content among the participants can also be used to communicate the recommended conversational input to the participants. Therefore, each dialog environment also includes a plurality of user content exchange and conversational input recommendation devices. Suitable devices include, but are not limited to, smart phones 114, speakers 120, computers 118 and video monitors 122. Some devices in the physical conversation environment can function as both content capture devices and conversational input recommendation devices. Each dialog environment and in particular the participant content exchange devices, content capture devices and conversational input recommendation devices are in communication with the monitoring and analysis system through one or more local or wide area networks 104.

Each physical environment can include additional devices that provide information on the mood, attentiveness, reaction, tone and physiological status of the participants. These additional devices include, but are not limited to, thermostats, thermometers, motion sensors, physiological sensors, activity sensors, biomedical sensors and combinations thereof. In one embodiment, any data and content capture device or system capable of monitoring social media, electronic calendars, electronic mail messages, text messages, global positioning data, audio communications, video communications and electronic transactions associated with the subject can be used. In one embodiment, all of the monitored content including the monitored indicators of physiological status are stored in a database on one or more hardware memories 105.

The monitoring and analysis system can be executing on one or more computing systems including distributed computing systems and cloud based computing systems. The monitoring and analysis system includes at least one logical processor executing software programs stored in databases on one or more hardware memories 105. The monitoring and analysis system includes a plurality of modules that provide the desired functions of the monitoring and analysis system. These modules include monitoring modules 126 to monitor and capture content from the conversations occurring in the physical environments containing the participants. These monitoring modules includes a text capture module 132 for capturing text based content, an audio capture module 130 for capturing audio content such as live conversations and a video capture module 128 for capturing still pictures and video of the physical environments. The modules also include a plurality of communication modules 127 to communicate recommended conversational inputs to the participants. The communication modules include a text presentation module 138 for delivering text based conversational inputs, an audio presentation module 136 for delivering audio based conversational inputs and a video presentation module 134 for delivering pictures and video based conversational inputs. The monitoring modules and communication modules are in communication with the devices in the physical environments across one or more local and wide area networks 104.

In addition, the modules include processing modules 124 to analyze the captured conversational input, to identify an overall goal of the conversation, to identify an overall goal of the interaction among the participants, to identify next objectives to be met in order to achieve the overall goal of the conversation, to identify recommended conversational inputs to achieve the next objectives and to determine confidence levels associated with next objectives and conversational inputs. All of the processing modules are in communication with the monitoring and communication modules. In one embodiment, the monitoring and communication modules 126 are part of an instrumented environment, and the processing modules 124 are provided in a cloud environment. The processing modules include an audio analysis module 140 to analyze sounds and conversations and oral communications in the physical environment for conversation content, for conversational tone and for emotions or physical status of the participants. A video analysis module 142 is provided to analyze pictures, including pictures of participants, objects and text, and video from the physical environment for conversation content, for conversational tone and for emotions or physiological status of the participants. A text analysis module 146 is provided to analyze the text of written communications among the participants, and perform, for example, key word extraction. In one embodiment, at least one of the audio analysis module, the video analysis module and the text analysis module utilizes natural language processing to analyze the oral and written content exchanged among the participants. A participant status determination module 150 analyzes the mood, attentiveness, reaction, tone and physiological status of the participants based on data captured from the physical environments. All of the analysis modules can include a functionality for identifying slang or other inappropriate language or for identifying when a participant exhibits a negative reaction to particular content in the conversation.

A conversation goal determination module 144 receives the analysis of the audio, video and text analysis modules. The conversation goal determination module can also receive input directly from one or more participants that identifies the goals of that participant with respect to the conversation. The conversation goal determination module is also in communication with the database to obtain a history of conversations and interactions among the participants. In one embodiment, the history of conversations and interactions among the participants includes the history of conversations among the plurality of participants. The history of conversations among the plurality of participants includes at least one of monitored content, overall goals of the conversations, exchanged conversational inputs with associated likelihoods of advancing the conversation to successful achievement of the overall goal of the conversation and results of the exchanged conversational inputs. In one embodiment, the history of conversations and interactions includes a history of conversation and interactions in which the previous participants overlap with the current participants but are not identical, containing either less than all of the current participants or additional participants. In one embodiment, the history of conversations and interactions includes conversations and interactions for completely different groups of participants. These third-party histories can be associated with a current conversation based on, for example, common goals or objectives in the conversations.

The conversation goal determination module uses the monitored and analyzed communication content, participant input and the history of conversations and interactions among the plurality of participants to identify an overall goal of the conversation. The overall goal of the conversation represents a motivation for at least one of the participants to engage in the conversation. In one embodiment, the overall goal of the conversation is to be achieved upon completion or termination of the conversation. The overall goal of the conversation can be the same as the overall goal of the interaction among the participants. Alternatively, the overall goal of the conversation is an intermediate goal in the overall goal of the interaction among the participants.

An objective and conversational input determination module 148 is in communication with the conversation goal determination module and receives the overall goal of the conversation. The objective and conversational input determination module is also provided with the monitored and analyzed conversation content, any physiological data on the participants, the history of conversations and interactions among the participant and any other relevant histories. The objective and conversational input determination module determines at least one or a plurality of potential next objectives to be completed in the conversation. In general, the objectives are steps to be taken in order to achieve the overall goal of the conversation. The objective and conversation input module identifies one of the potential next objectives as the next objective to be completed in the conversation. These next objective can take into account the logical order in which objectives or tasks need to be completed, the current receptiveness of any given participant to the next objective and a history of the order in which objectives where handled during previous conversations.

Having identified the next objective, the objective and conversation input determination module identifies at least one conversational input. Alternatively, a plurality of conversational inputs is identified. Each conversational input is relevant to the monitored. Suitable conversational inputs include, but are not limited to, documents to be shored among the participants, content to be delivered orally, content to be delivered in writing and a recommended tone for the conversation. The objective and conversation input determination module associates with each conversational input a likelihood of advancing the conversation to a successful achievement of the next objective and therefore the overall goal of the conversation. The associated likelihood also includes the likelihood of a given conversational input being positively received by the other participants at that time. The objective and conversation input determination module can use the monitored and analyzed conversation content, any physiological data on the participants and the history of conversations and interactions among the participants and any other relevant histories in determining the associated likelihood the monitored and analyzed conversation content, any physiological data on the participants and the history of conversations and interactions among the participants for each conversational input. When multiple conversational inputs have been identified, the objective and conversation input determination module identifies the conversational input associated with the highest likelihood of advancing the conversation to a successful achievement of the next objective and overall goal. The identified conversational input can also include an identification of the participant or participants to receive the recommended conversational input.

The objective and conversation input determination module is in communication with a conversation input delivery module 154, which receives the selected conversational input and an identification of the participants to receive the conversational input. The conversation input delivery module, through the communication modules, intervenes in the conversation to communicate the recommended conversational input to the participants using one or more of the devices located in the physical environment associated with those participants. A feedback module 152 analyzes the monitored content of the conversation following the communication of the conversational input to determine impacts on the conversation and the participants. This includes determining if the conversational input was actually used, the reaction of the other participants to the conversational input and the success of the conversational input in achieving the next objective and the overall goal of the conversation. In one embodiment, this feedback is used to update the likelihood of advancing the conversation to a successful achievement of the next objective and overall goal associated with the communicated conversational input. Each one of the processing modules 124 is in communication with the database 105 and includes the functionality to update the history of interactions among the participants that is stored in the database.

Figure 2:
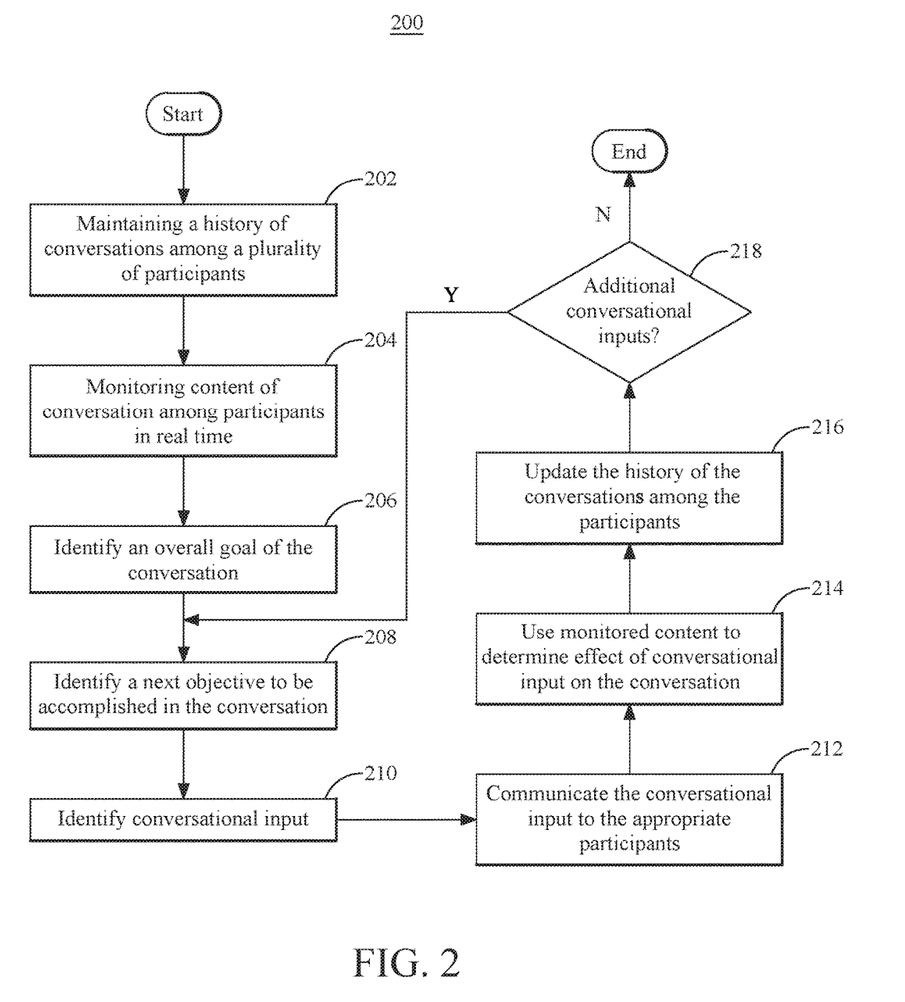
FIG. 2 is a flow chart illustrating an embodiment of a method for intelligent action recommendation in a conversation.

Referring now to FIG. 2, exemplary embodiments are also directed to a method for intelligent action recommendation in a conversation 200. A history of interactions and conversations among a plurality of participants is maintained 202, for example in one or more databases. The history of conversations among the plurality of participants includes, but is not limited to, at least one of monitored content, overall goals of the conversations, exchanged conversational inputs with associated likelihoods of advancing the conversation to successful achievement of the overall goal of the conversation and results of the exchanged conversational inputs.

Content of a conversation among a plurality of participants is monitored in real time 204. In one embodiment, the monitored conversation includes at least two participants. In one embodiment, monitoring content of the conversation includes capturing at least one of oral communications among the participants, written communications among the participants, video of an environment containing at least one of the participants and physiological data for one or more participants. In one embodiment, oral communications among the participants are captured, and natural language processing is used to analyze the oral communications to obtain the content of the conversation.

An overall goal of the conversation is identified 204. This overall goal of the conversation represents a motivation for at least one of the participants to engage in the conversation. In addition, the overall goal of the conversation is to be achieved upon termination of the conversation. One or more of the captured content of the conversation, the history of the conversations among the participants, other relevant histories of conversations and express input from one or more of the participants is used to determine the overall goal of the conversation. Having identified the overall goal of the conversation, a next objective to be accomplished in the conversation to advance the conversation toward the overall goal of the conversation is identified 208. In one embodiment, a plurality of potential next objectives is identified, and the next objective is selected from this plurality of potential next objectives. Selection can be based on the history of conversations among the participants, a desired or preferred order of completion of the objectives of the conversation and the current content and tone of the conversation, among other factors.

At least one conversational input relevant to the monitored content of the conversation is identified 210. The conversational input has an associated likelihood of advancing the conversation to successful achievement of the overall goal of the conversation. Suitable conversational inputs include, but are not limited to, text to be exchanged in writing, text to be spoken, a recommended conversational tone, physical gestures and combinations thereof. At least one of the history of interactions among the participants, histories of other relevant conversations, the current tone of the conversation and the current physiological status of one or more participants are taken into account in identified the appropriate conversational inputs. In one embodiment, a plurality of conversational inputs is identified, and each conversational input has a separate associated likelihood of advancing the conversation to successful achievement of the overall goal of the conversation. The conversational inputs having the highest likelihood of advancing the conversation to successful achievement of the overall goal of the conversation are selected. In one embodiment, the at least one conversational input is identified to achieve the next objective. In one embodiment, one or more participants to receive the recommended conversational inputs are identified.

The conversational input is then communicated to at least one of the participants in the conversation 212, or to all of the participants identified to receive the conversational input. The monitored content of the conversation is used to determine an effect of the communicated conversational input on achieving the overall goal or the next objection of the conversation 214. The history of the conversations among the participants is then updated 216 in accordance with the monitored effects of the conversational input. A determination is made regarding whether or not additional conversational inputs are needed to achieve the next objective or the overall goal of the conversation 218. If additional conversational inputs are required, then the steps for monitoring the conversational content and identifying next objectives and conversational inputs are repeated.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to apparatus (systems) and computer program products according to embodiments of the invention. It will be understood that each description and illustration can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

The schematic illustrations and block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, with the possible exception of limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 3:
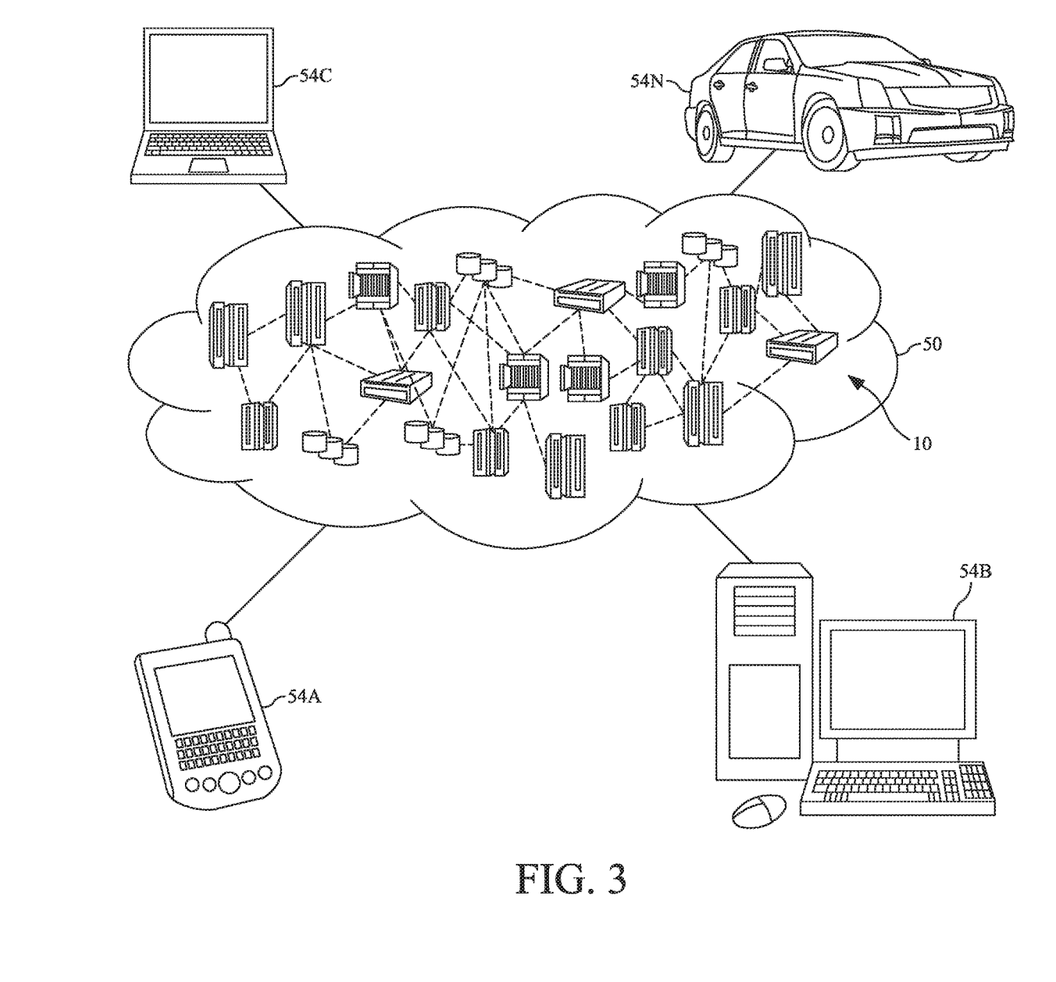
FIG. 3 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 3, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection, e.g., using a web browser.

Figure 4:
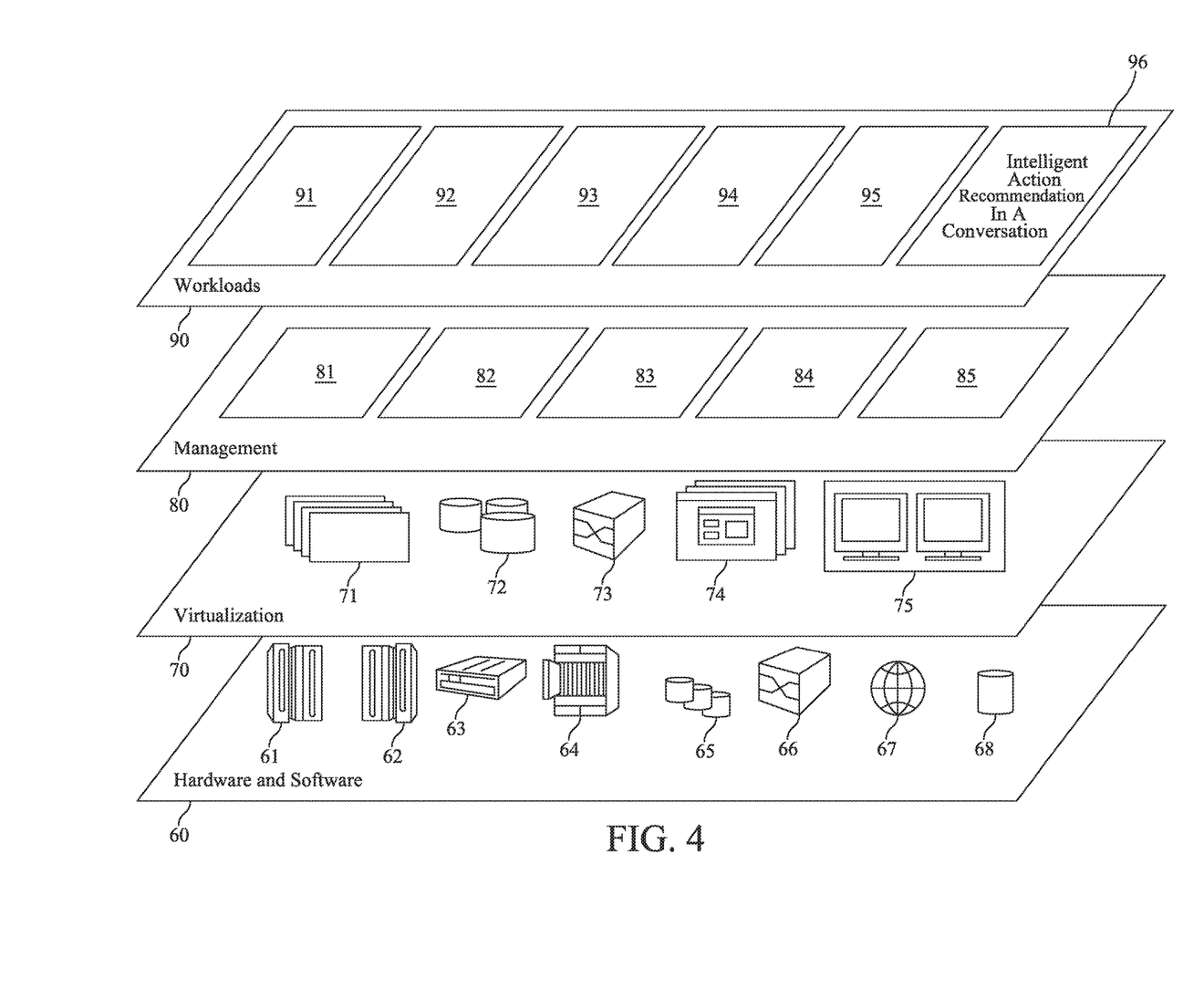
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided. A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent action recommendation in a conversation 96.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for intelligent action recommendation in a conversation in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for intelligent action recommendation in a conversation, the method comprising using a monitoring and analysis system executing on a computing system to:
    monitor content of a conversation among at least two participants in real time, the monitoring and analysis system separate from and independent of the conversation, the participants and user devices associated with the participants and used to conduct the conversation;
    identify an overall goal that is to be achieved among the participants using the conversation and an overall interaction goal among the participants, the overall goal comprising an intermediate step in the overall interaction goal and representing a motivation for at least one of the participants to engage in the conversation, the overall goal and the overall interaction goal generated by at least one of the participants independent of the monitoring and analysis system prior to initiation of the conversation, the overall goal to be achieved upon termination of the conversation;
    identify at least one conversational input relevant to the monitored content and comprising a likelihood of advancing the conversation to successful achievement of the overall goal; and
    communicate the conversational input to at least one of the participants in the conversation.

2. The method of claim 1, wherein monitoring content of the conversation comprises capturing at least one of oral communications among the participants, written communications among the participants, video of an environment containing at least one of the participants and physiological data for one or more participants.

3. The method of claim 1, wherein monitoring content of the conversation comprises:
    capturing oral communications among the participants; and
    using natural language processing to analyze the oral communications.

4. The method of claim 1, wherein the conversational input comprises text to be exchanged in writing, text to be spoken, a recommended conversational tone, physical gestures or combinations thereof.

5. The method of claim 1, wherein identifying that at least one conversational input further comprises:
    identifying at plurality of conversational inputs, each conversational input comprising an associated likelihood of advancing the conversation to successful achievement of the overall goal of the conversation; and
    selecting the conversational inputs having the highest likelihood of advancing the conversation to successful achievement of the overall goal of the conversation.

6. The method of claim 1, wherein identifying the at least one conversational input further comprises using a history of conversations among the plurality of participants to identify the at least one conversation input.

7. The method of claim 6, wherein the method further comprises using the monitoring and analysis system to maintain the history of conversations among the plurality of participants, the history of conversations among the plurality of participants comprising at least one of monitored content, overall goals of the conversations, exchanged conversational inputs with associated likelihoods of advancing the conversation to successful achievement of the overall goal of the conversation and results of the exchanged conversational inputs.

8. The method of claim 1, wherein:
    the method further comprises using the monitoring and analysis system to identify a next objective to be accomplish in the conversation to advance the conversation toward the overall goal of the conversation; and
    identifying the at least one conversational input further comprises identifying the at least one conversational input to achieve the next objective.

9. The method of claim 1, wherein the monitoring and analysis engine uses the monitored content of the conversation to determine an effect of the communicated conversational input on achieving the overall goal of the conversation.

10. A non-transitory computer-readable storage medium containing a computer-readable code that when read by a computer causes the computer to perform a method for intelligent action recommendation in a conversation, the method comprising using a monitoring and analysis system executing on a computing system to:
monitor content of a conversation among at least two participants in real time, the monitoring and analysis system separate from and independent of the conversation, the participants and user devices associated with the participants and used to conduct the conversation;
identify an overall goal that is to be achieved among the participants using the conversation and an overall interaction goal among the participants, the overall goal comprising an intermediate step in the overall interaction goal and representing a motivation for at least one of the participants to engage in the conversation, the overall goal to be achieved upon termination of the conversation, the overall goal and the overall interaction goal generated by at least one of the participants independent of the monitoring and analysis system prior to initiation of the conversation;
identify at least one conversational input relevant to the monitored content and comprising a likelihood of advancing the conversation to successful achievement of the overall goal; and
communicate the conversational input to at least one of the participants in the conversation.

11. The non-transitory computer-readable storage medium of claim 10, wherein monitoring content of the conversation comprises capturing at least one of oral communications among the participants, written communications among the participants, video of an environment containing at least one of the participants and physiological data for one or more participants.

12. The non-transitory computer-readable storage medium of claim 10, wherein monitoring content of the conversation comprises:
capturing oral communications among the participants; and
using natural language processing to analyze the oral communications.

13. The non-transitory computer-readable storage medium of claim 10, wherein the conversational input comprises text to be exchanged in writing, text to be spoken, a recommended conversational tone, physical gestures or combinations thereof.

14. The non-transitory computer-readable storage medium of claim 10, wherein identifying that at least one conversational input further comprises:
identifying at plurality of conversational inputs, each conversational input comprising an associated likelihood of advancing the conversation to successful achievement of the overall goal of the conversation; and
selecting the conversational inputs having the highest likelihood of advancing the conversation to successful achievement of the overall goal of the conversation.

15. The non-transitory computer-readable storage medium of claim 10, wherein identifying the at least one conversational input further comprises using a history of conversations among the plurality of participants to identify the at least one conversation input.

16. The non-transitory computer-readable storage medium of claim 15, wherein the method further comprises using the monitoring and analysis system to maintain the history of conversations among the plurality of participants, the history of conversations among the plurality of participants comprising at least one of monitored content, overall goals of the conversations, exchanged conversational inputs with associated likelihoods of advancing the conversation to successful achievement of the overall goal of the conversation and results of the exchanged conversational inputs.

17. The non-transitory computer-readable storage medium of claim 10, wherein:
the method further comprises using the monitoring and analysis system to identify a next objective to be accomplish in the conversation to advance the conversation toward the overall goal of the conversation; and
identifying the at least one conversational input further comprises identifying the at least one conversational input to achieve the next objective.

18. The non-transitory computer-readable storage medium of claim 10, wherein the monitoring and analysis system uses the monitored content of the conversation to determine an effect of the communicated conversational input on achieving the overall goal of the conversation.

19. A computing system for intelligent action recommendation in a conversation, the computing system comprising a monitoring and analysis system comprising:
monitoring modules to monitor content of a conversation among at least two participants in real time;
a conversation goal determination module to identify an overall goal that is to be achieved among the participants using the conversation and an overall interaction goal among the participants, the overall goal comprising an intermediate step in the overall interaction goal and representing a motivation for at least one of the participants to engage in the conversation, the overall goal and overall interaction goal generated by at least one of the participants independent of the monitoring and analysis system prior to initiation of the conversation, the overall goal to be achieved upon termination of the conversation;
an objective and conversational input determination module to identify at least one conversational input relevant to the monitored content and to determine a likelihood of advancing the conversation to successful achievement of the overall goal for the at least one conversational input; and
communication modules to communicate the conversational input to at least one of the participants in the conversation;
wherein the monitoring and analysis system is separate from and independent of the conversation, the participants and user devices associated with the participants and used to conduct the conversation.

20. The computing system of claim 19, wherein:
the objective and conversational determination module is further configured to identify a next objective to be accomplish in the conversation to advance the conversation toward the overall goal of the conversation; and
the objective and conversational determination module identifies the at least one conversational input to achieve the next objective.

* * * * *